(12) United States Patent
Langston et al.

(10) Patent No.: US 6,272,351 B1
(45) Date of Patent: Aug. 7, 2001

(54) SYSTEM AND METHOD FOR RELAYING SIGNALS TO BASE STATIONS IN A WIRELESS COMMUNICATIONS SYSTEM

(75) Inventors: J. Leland Langston, Richardson; Douglas B. Weiner, The Colony; William K. Myers, McKinney; James S. Marin, Murphy, all of TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/993,182

(22) Filed: Dec. 18, 1997

Related U.S. Application Data (60) Provisional application No. 60/033,503, filed on Dec. 19, 1996.

(51) Int. Cl.[7] ............................... H04B 7/14; H04B 7/00
(52) U.S. Cl. ............................. 455/507; 455/561; 455/7; 348/21
(58) Field of Search ................................. 455/67.1, 432, 455/561, 562, 507, 454, 426, 450, 62, 63, 7, 15, 16, 17; 348/21, 469

(56) References Cited

U.S. PATENT DOCUMENTS

| | | | |
|---|---|---|---|
| 3,906,166 | * 9/1975 | Cooper et al. | 179/41 |
| 4,965,850 | * 10/1990 | Schloemer | 455/33 |
| 5,408,679 | * 4/1995 | Masuda | 455/11.1 |
| 5,596,330 | * 1/1997 | Yokev et al. | 342/387 |
| 5,839,074 | * 11/1998 | Plehn | 455/450 |
| 5,890,056 | * 3/1999 | Garner et al. | 455/67.1 |

* cited by examiner

*Primary Examiner*—Fan Tsang
*Assistant Examiner*—William Trost
(74) *Attorney, Agent, or Firm*—Baker Botts L.L.P.

(57) ABSTRACT

A wireless communication system (100) is disclosed in which a central office (102) generates a signal. A first base station (104) receives the central office signal and transmits a first broadcast signal in a first frequency range in response to the central office signal. A second base station (124) receives the first broadcast signal and transmits a second broadcast signal in a second frequency range in response to the first broadcast signal. A third base station (134) receives the second broadcast signal and transmits a third broadcast signal in the first frequency range in response to the second broadcast signal. In accordance with the present invention, a plurality of base stations are each able to provide one-way or two-way communication to a plurality of customers (110, 130, 140), with only one base station (104) receiving signals directly from the central office (102).

22 Claims, 3 Drawing Sheets

SYSTEM AND METHOD FOR RELAYING SIGNALS TO BASE STATIONS IN A WIRELESS COMMUNICATIONS SYSTEM

This application claims priority under 35 U.S.C. § 119(e)(1) of provisional application Ser. No. 60/033,503, which was filed on Dec. 19, 1996.

TECHNICAL FIELD OF THE INVENTION

The present invention relates generally to the field of communications systems, and more particularly to a repeater node network system and method.

BACKGROUND OF THE INVENTION

In a point-to-multipoint wireless communication system, a central office communicates throughout a coverage area with multiple remote base stations, which in turn communicate with customer transmitter-receiver units, known as customer premises equipment (CPE). This communication may include the passing of voice, data and video signals between the central office and the customer.

Each remote base station, or node, communicates with customer premises equipment by means of extremely high-frequency radio waves. The central office communicates with each node by means of a fiber optic cable. Providing a fiber optic cable connection between the central office and each node adds significantly to the cost of the system.

SUMMARY OF THE INVENTION

Therefore, a need has arisen for a wireless communication system that overcomes the disadvantages and deficiencies of the prior art.

In accordance with one wireless communication system is disclosed in which a central office generates a signal. A first base station or node receives the central office signal and transmits a first broadcast signal in a first frequency range in response to the central office signal. A second base station receives the first broadcast signal and transmits a second broadcast signal in a second frequency range in response to the first broadcast signal. A third base station receives the second broadcast signal and transmits a third broadcast signal in the first frequency range in response to the second broadcast signal.

A technical advantage of the present invention is that a plurality of base stations are each able to provide one-way or two-way communication to a plurality of customers, with only one base station receiving signals directly from the central office. Another technical advantage is that the base stations in the disclosed system are each able to simultaneously transmit and broadcast signals with minimal feedback between the receiver and the broadcast transmitter.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

The preferred embodiment of the present invention and its advantages are best understood by referring to FIGS. 1 through 5 of the drawings, like numerals being used for like and corresponding parts of the various drawings.

Figure 1:
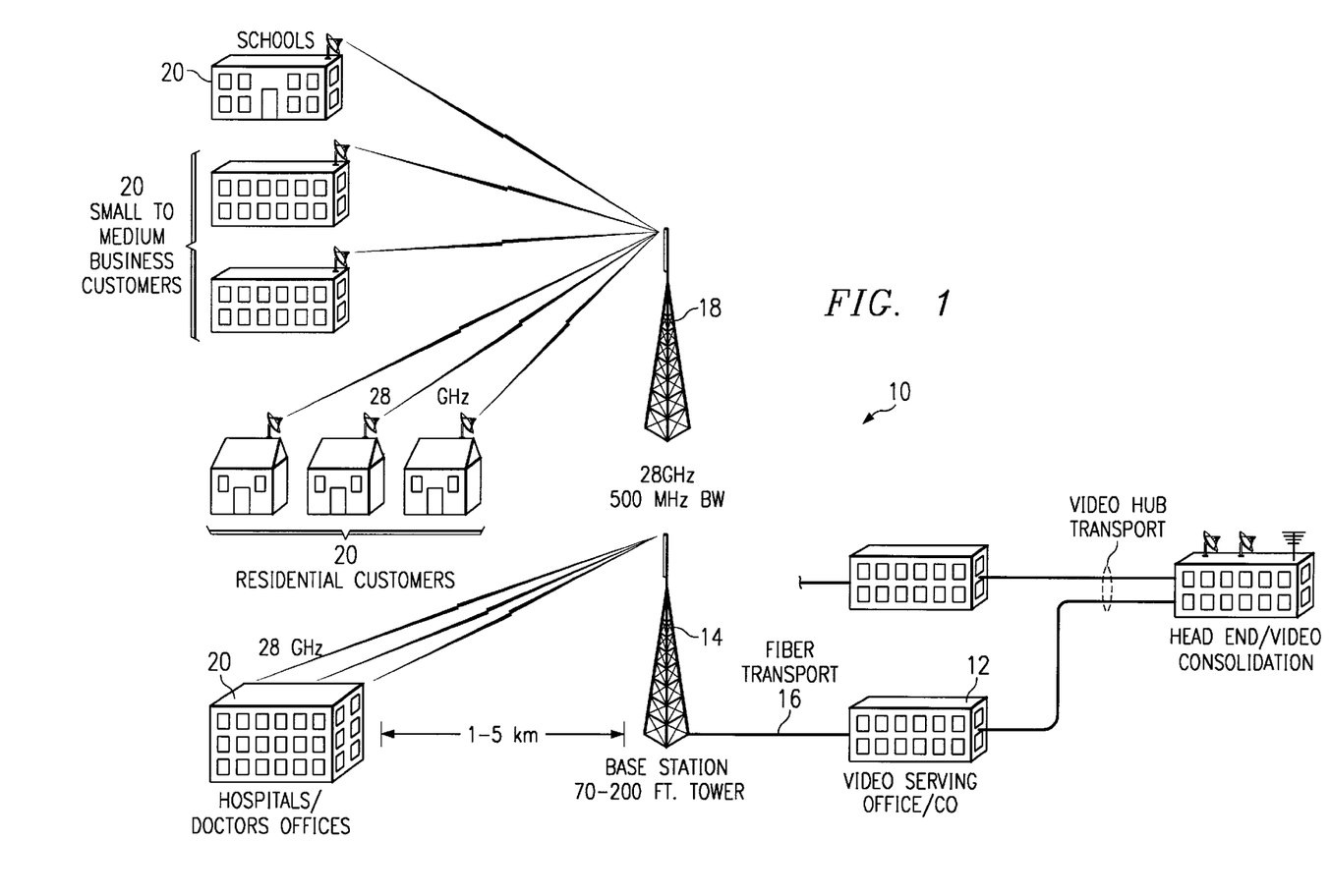
FIG. 1 is an overview of a point-to-multipoint communications system.

Referring to FIG. 1, a point-to-multipoint communications system 10 is shown. Communications system 10 includes a central station or central office 12 which communicates with a primary base station 14 by means of a fiber optic cable 16. Communications system 10 also includes a plurality of secondary base stations 18 which receive signals from primary base station 14 in a manner to be described below. Primary base station 14 and secondary base stations 18 broadcast signals which are received at a plurality of customer locations 20, which may include hospitals, residences, businesses and schools, as shown.

In this example, each base station 14 or 18 comprises a tower with a height between 70 and 200 feet and a transmitter system (not explicitly shown) to be described below. Alternatively, a base station 14 or 18 may be mounted on a building or other tall structure, thus eliminating the need for a tower. Each base station 14 or transmits signals at approximately 28 GHz with a 500 MHZ bandwidth. The reception range for each base station's signal is approximately 1–5 km. (kilometers)

Figure 2:
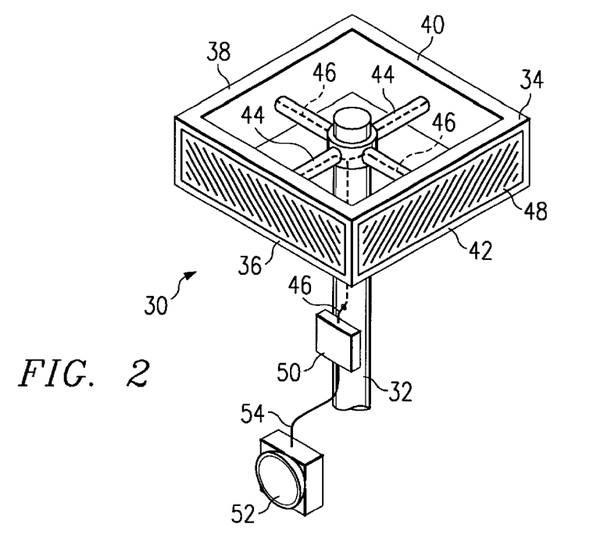
FIG. 2 is a perspective view- -of a repeater node transmitter-receiver system.

Referring to FIG. 2, a repeater node transmitter-receiver system 30 for use in communications system 10 is shown. System 30 includes a post 32 for supporting a four-quadrant sectorized antenna complex 34 comprising four panel array antennas 36, 38, 40 and 42. Panel array antennas 36 through 42 are mounted to post 32 via supports 44 housing coaxial transmission lines 46. Each panel array antenna 36 through 42 comprises an array of polarized transmitting and receiving antenna elements 48. The polarization of antenna elements 48 is such that panels 36 and 40 transmit 45° slant polarized waves, while panels 38 and 42 transmit −45° slant polarized waves. Alternatively, any other orthogonal polarization scheme may be used, such as horizontal and vertical polarization.

Panel array antennas 36 through 42 each broadcast a signal across a 90° arc. Therefore, a full 360° broadcast coverage is provided about the center of node transmitter system 30, with the signal polarization alternating by 90° for each quadrant of the coverage area. The signal broadcast by panel array antennas 36 through 42 is determined by a processor 50 mounted in the vicinity of antenna complex 34, which sends the broadcast signal to panel array antennas 36 through 42 at an intermediate frequency (IF) such as 950 to 1,950 MHZ via transmission lines 46.

Each panel array antenna 36 through 42 has a transmit module (not shown) which includes a frequency converter, a power amplifier, a mixer and a local oscillator. The signal received from processor SO via transmission lines 46 is converted to the broadcast frequency, such as 28 GHz, and amplified by the transmit module prior to broadcast.

A highly directional receiving antenna 52 is also mounted in the vicinity of antenna complex 34. Receiving antenna 52 is positioned to receive signals from an adjacent node, as will be explained more fully below. Receiving antenna 52 includes a frequency converter (not shown) which converts the signals received from the adjacent node to an IF frequency such as 950 to 1,950 MHZ. The down-converter signals are then transmitted to processor 50 via coaxial cable 54.

Processor 50 may be operable to receive signals from receiving antenna 52, shift the frequency of the received signals, and send an output signal to panel array antennas 36 through 42. In addition, processor 50 may be operable to demodulate the received signals and remodulate the signals at an appropriate output IF frequency. This demodulation and remodulation provides for a higher signal-to-noise ratio (SNR) in the output signal, which may be important in certain network configurations to be described below. If demodulation and remodulation are performed, processor 50 may be configured to remodulate with a higher order modulation, allowing more efficient spectrum utilization.

In the following discussion, it will be understood that, while extremely high frequency signals such as the 28 GHz signals discussed herein may be transmitted over significant distances through air, transmission of such frequencies through coaxial cable is impractical due to excessive power loss and other difficulties. Thus, internal signal processing and transmission at each base station is performed at IF Frequencies. At each base station, incoming signals are down-converted, signal processing is performed, and the resulting signals are up-converted at the transmitter. It will be understood that the down-conversion and up-conversion steps are performed even when not explicitly mentioned in the following description. Thus, when processor 50 is described as shifting signals from extremely high frequency band A to band B, or vice versa, such a shift is actually performed at IF frequencies, prior to up-conversion of the signals.

Figure 3:
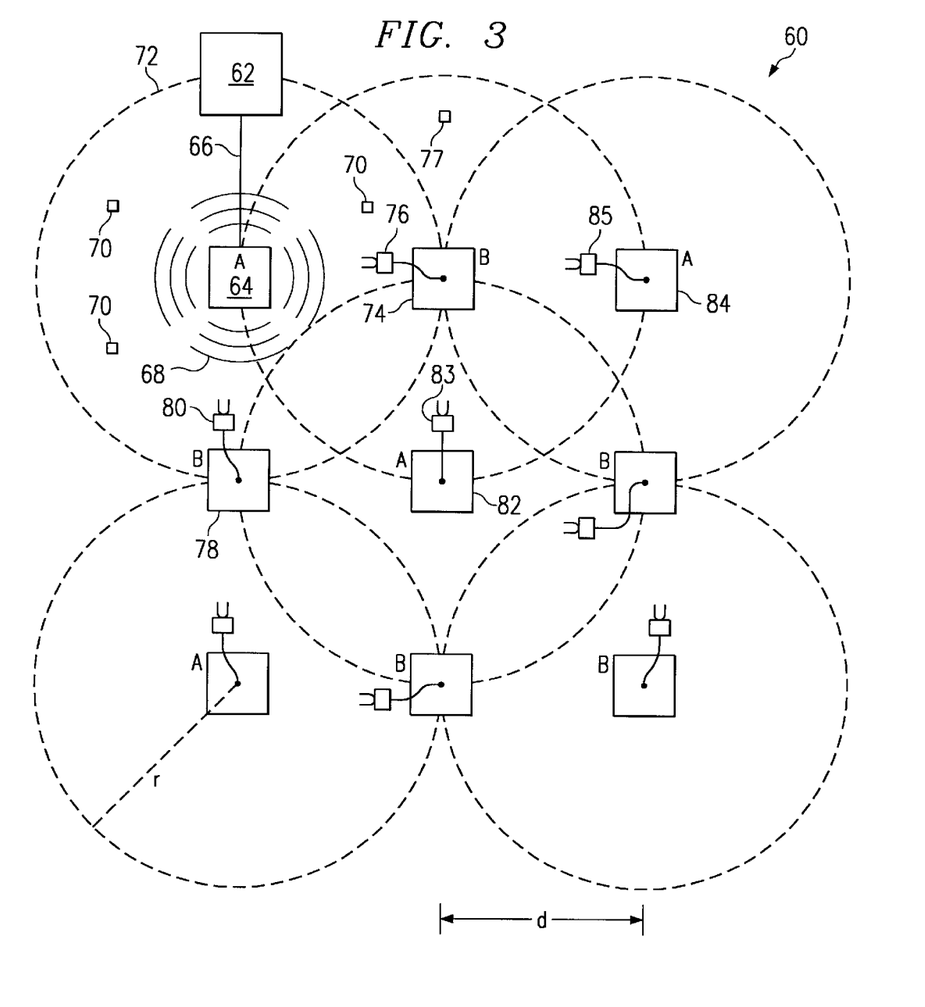
FIG. 3 is a top plan view of a wireless communication network in accordance with the present invention.

Referring to FIG. 3, a repeater node network 60 in accordance with the invention is shown. Network 60 represents one possible configuration for a point-to-multipoint communications system such as system 10 shown in FIG. 1. Network 60 is particularly well-suited for the one-way transmission of the same signal to all of the customers in a coverage area, as will become apparent from the following description. Thus, network 60 may be used to transmit audio and video news and entertainment, much like typical broadcast radio and television.

Network 60 comprises a central office 62 which sends a digital audio/video signal to a primary base station 64 via fiber optic cable 66. Alternatively, central office 62 may provide a signal to primary base station 64 through wireless transmission, coaxial cable, or other signal transmission means.

Primary base station 64 includes a node transmitter system similar to repeater node transmitter-receiver system 30 shown in FIG. 2, but without receiving antenna 52. Primary base station 64 transmits a broadcast signal 68 to customer premises equipment 70 located within its coverage area 72. In this example, customer premises equipment 70 comprises a receiving dish antenna approximately eight to 12 inches in diameter.

Figure 5:
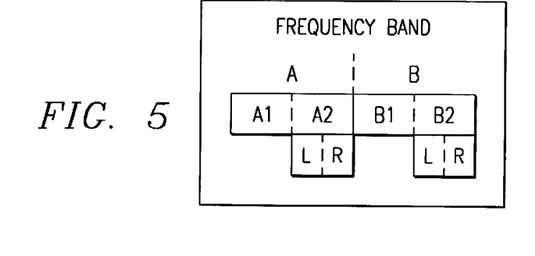
FIG. 5 is a block diagram illustrating the communication frequency spectrum use by the communications system of FIG. 1.

Broadcast signal 68 falls within a frequency band labeled "A," comprising approximately one-half of the bandwidth available for network 60, as shown in FIG. 5. For example, if a bandwidth of 1 GHz is available at a frequency of 28 GHz, frequency band A may comprise frequencies from 27.5 GHz to 28 GHz. A second frequency band, labeled "B," occupies the other half of the available spectrum, such as 28 GHz to 28.5 GHz.

A secondary base station 74 is located near the periphery of coverage area 72 of primary base station 64. Secondary base station 74 includes a repeater node transmitter-receiver system such as system 30 shown in FIG. 2, including a highly directional receiving antenna 76 similar to antenna 52. Receiving antenna 76 is directed toward primary base station 64, and receives broadcast signals 68 therefrom.

Signals received by receiving antenna 76 are down-converted to an IF frequency sent to a signal processor such as processor 50 shown in FIG. 2. The signal processor, which is mounted on secondary base station 74, operates at IF frequencies to shift the received signals from the IF equivalent of frequency band A to frequency band B. The signal processor transmits the shifted signals to broadcast antennas such as panel array antennas 36 through 42 shown in FIG. 2, where the signals are up-converted from IF to frequency band B and then broadcast.

Secondary base station 74 therefore broadcasts a signal with a content identical to that of broadcast signal 68, but in a different frequency band. Customer premises equipment 77 tuned to frequency band B within the coverage area of secondary base station 74 may receive the broadcast signal from secondary base station 74.

The frequency band shift from band A to band B allows secondary base station 74 to simultaneously receive and broadcast signals without significant feedback between the broadcast antennas 36 through 42 and receiving antenna 76. Feedback is further suppressed by the highly directional nature of receiving antenna 76, which is oriented away from the broadcast antennas of secondary base station 74.

It will be apparent that secondary base station 74 receives its signal content indirectly from central office 62, without a fiber optic connection to central office 62. Receiving antenna 76 is significantly less expensive than a fiber optic cable between secondary base station 74 and central office 62. Thus, network 60 may be built more easily and with less expense than a similar network with fiber optic connections between each secondary base station and the central office.

Like secondary base station 74, secondary base station 78 receives broadcast signal 68 from primary base station 64 through a receiving antenna 80. Secondary base station 78 shifts the frequency of the received signals from frequency band A to frequency band B, and rebroadcasts the signals in the latter frequency band.

Secondary base stations 82 and 84 receive broadcast signals from secondary base station 74 through receiving antennas 83 and 85, respectively. Secondary base stations 82 and 84 shift the frequency of the received signals from frequency band B to frequency band A, and re-broadcast the signals in the latter frequency band. As with secondary base stations 74 and 78, secondary base stations 82 and 84 are able to simultaneously receive and transmit signals with minimal feedback due to the frequency shift between the received and broadcast signals. Moreover, the spatial separation between secondary base stations 82 and 84 and primary base station 64 minimizes signal interference for customer premises equipment with directional receiving antennas located within coverage area 72.

Following the pattern described above, network 60 may comprise a grid array of secondary base stations, each receiving a signal in one frequency band A or B and broadcasting in the other frequency band. This grid array may extend indefinitely in any direction, with only primary base station 64 having a fiber optic cable connection to central office 62.

In a large array, a base station located a significant distance away from central office 62 receives a signal relayed through a chain of several secondary base stations.

Each secondary base station in the chain slightly degrades the signal-to-noise ratio (SNR) of the signal. Thus, in a chain of more than three or four base stations, there may be unacceptable SNR degradation at the final base station. This problem may be minimized with a network design which ensures that each secondary base station receives its signal from primary base station 64 along the shortest route possible. However, in a large array, additional measures may be required to correct this problem.

One solution is to establish a plurality of primary base stations such as primary base station 64, each primary base station providing high SNR source signal for its region of network 60. This solution would require fiber optic cable connections between central office 62 and a plurality of primary base stations.

Another solution to the problem of signal degradation is to provide signal demodulation and remodulation in certain base station processors. The equipment required to demodulate and remodulate would be expensive to install in every base station in network 60. However, demodulation and remodulation need only be provided at selected intervals in a chain of base stations, such as every three or four base stations, to prevent unacceptable SNR degradation. Thus, a plurality of quasi-primary base stations may be established, each quasi-primary base station having demodulation/remodulation equipment and providing high SNR source signal for its region of network 60. This solution provides signal integrity comparable to that provided by a network with multiple primary base stations, but may be less expensive than the option of establishing fiber optic cable connections to each quasi-primary base station.

In the example shown in FIG. 3, each base station has a coverage area which is roughly circular and has a radius r. The base stations are arranged in a square array with a uniform separation distance d. In this example, d is approximately equal to r, placing most customers in overlapping coverage areas. Most customers may orient their directional receiving antennas toward any one of a plurality of base stations, based upon local geography, proximity and line-of-sight obstructions at the customer location.

However, the receiving antennas 76, 80, 83, 85 used by the base stations are highly directional and may be quite sensitive. Thus, each base station could be located well outside the coverage areas of adjacent base stations, without significantly degrading the performance of network 60. This would decrease the density of base stations in network 60, allowing increased coverage area and/or reduced cost for the network.

Figure 4:
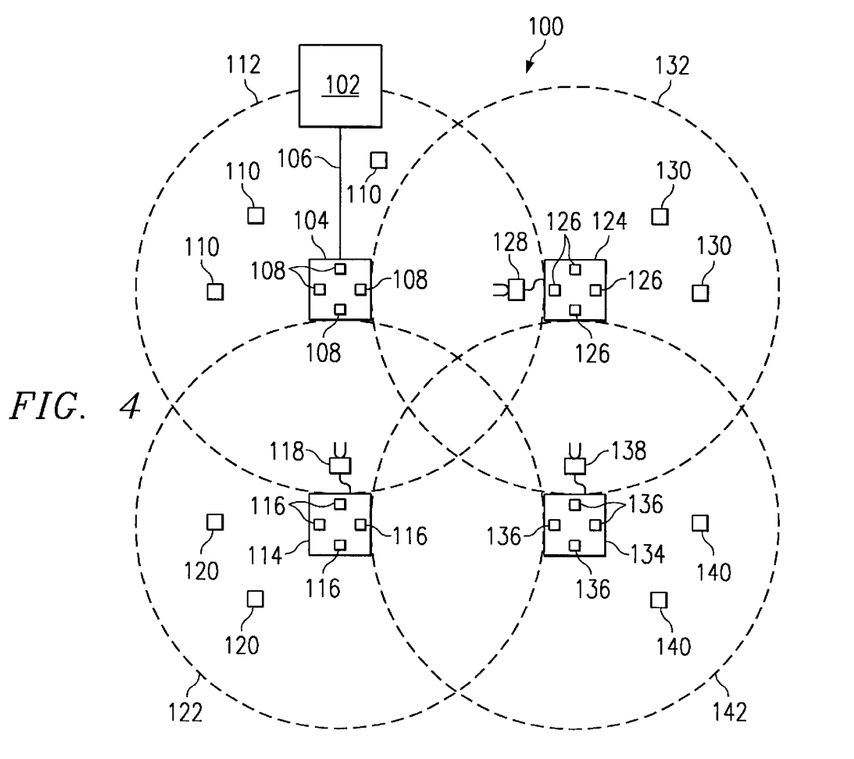
FIG. 4 is a top plan view of an alternative wireless communication network in accordance with the present invention.

Referring to FIG. 4, a wireless communications network 100 in accordance with the present invention is shown. Network 100 represents an alternative configuration for a point-to-multipoint communications system such as system 10 shown in FIG. 1. Network 100 is well-suited for the two-way transmission of individualized signal content to a plurality of customers, as will become apparent from the following description. Thus, network 100 may be used to transmit telephony, data and videoconference signals, as well as audio and video news and entertainment on demand.

Network 100 comprises a central office 102 which sends a digital signal to a primary base station 104 via fiber optic cable 106. Primary base station 104 includes a node transmitter system similar to repeater node transmitter-receiver system 30 shown in FIG. 2, but without a directional receiving antenna 52. Primary base station 104 includes a plurality of non-directional receiving antennae 108, for receiving signals in frequency band A1 from customer premises equipment (CPE) units 110 located within its coverage area 112.

In this example, each CPE unit 110 comprises a receiving dish antenna approximately eight to 12 inches in diameter, and a separate transmitting dish antenna of approximately the same size. CPE units 110 receive broadcast signals from primary base station 104 in the "local" portion (designated "L") of frequency band A2 as shown in FIG. 5, and transmit signals to primary base station 104 in frequency band A1. The transmission and reception frequency assignments for network 100 are set forth in TABLE A. It should be noted that each CPE unit only utilizes a relatively narrow transmission channel within the assigned transmission frequency band. This allows multiple CPE units to transmit simultaneously to each base station in network 100.

In a manner similar to a cellular telephone network, primary base station 104 broadcasts a non-directional signal in frequency band A2 which may include, in the local portion, a plurality of individualized signals, such as telephone conversations or data transmissions, each intended for separate CPE units 110. A significant portion of the transmission frequency band A2, designated "R" in FIG. 5, is dedicated to providing outgoing relay signals to adjacent secondary base stations, as will be explained more fully below. Likewise, a significant portion of the reception frequency band A1 is dedicated to receiving incoming relay signals from adjacent secondary base stations.

TABLE A

| | Frequency Band | | | |
|---|---|---|---|---|
| | A | | B | |
| | A1 | A2 | B1 | B2 |
| Base Station 104 (broadcast) | R | T | | |
| CPE 110 | T | R | | |
| Base Station 114 (directional) | T | R | | |
| Base Station 114 (broadcast) | | | R | T |
| CPE 120 | | | T | R |
| Base Station 124 (directional) | T | R | | |
| Base Station 124 (broadcast) | | | R | T |
| CPE 130 | | | T | R |
| Base Station 134 (directional) | | | T | R |
| Base Station 134 (broadcast) | R | T | | |
| CPE 140 | T | R | | |

Secondary base station 114 includes a repeater node transmitter-receiver system such as system 30 shown in FIG. 2, including a highly directional transmit-receive antenna 118 such as antenna 52. Transmit-receive antenna 118 is directed toward primary base station 104, and receives broadcast signals therefrom. In one embodiment, transmit-receive antennas 118 may comprise two separate dish antennae, one for signal transmission and one for reception.

Signals received by transmit-receive antenna 118 are down-converted to an IF frequency and sent to a signal processor such as processor 50 shown in FIG. 2. The signal processor, which is mounted on secondary base station 114, shifts the relay portion of the received signals from the IF equivalent of frequency band A2 to frequency band B2 and transmits the shifted signals to broadcast antennas such as panel array antennas 36 through 42 shown in FIG. 2, where the signals are up-converted from IF to frequency band B2 and broadcast. Secondary base station 114 therefore broadcasts a signal with the content contained in the relay portion of the broadcasted signal from primary base station 104, but in a different frequency band 32. customer premises equipment units 120 within the coverage area 122 of secondary base station 114 receive broadcast signals in the local portion of frequency band B2, and transmit signals to secondary base station 114 in frequency band B1. The signals from CPE units 120 are received by non-directional receiving antennas 116, where the signals are down-converted to an IF frequency and sent to signal processor So. Signal processor 50 shifts the frequency of the received CPE signals to the IF equivalent frequency base for frequency band A1 and sends the signals to transmit-receive antenna 118, where the signals are up-converted to frequency band A1 and transmitted to primary base station 104. The frequency assignments for transmit-receive antenna 118 are indicated in TABLE A with the entry "Base Station 114 (directional)." These frequency assignments are the same as the frequency assignments for CPE units 110 within coverage area 112. Thus, secondary base station 114 appears to primary base station 104 much like another CPE unit 110, although secondary base station 114 may require a higher transmission channel bandwidth than a typical CPE unit 110.

Like secondary base station 114, secondary base station 124 includes a repeater node transmitter-receiver system such as system 30 shown in FIG. 2, including a highly directional transmit-receive antenna 128 such as antenna 52. Transmit-receive antenna 128 is directed toward primary base station 104, and receives broadcast signals therefrom. In one embodiment, transmit-receive antenna 128 may comprise two separate dish antennas, one for signal transmission and one for reception.

Signals received by transmit-receive antenna 128 are sent to a signal processor such as processor 50 shown in FIG. 2. The signal processor, which is mounted on secondary base station 124, shifts the relay portion of the received signals from frequency band A2 to frequency band B2, and transmits the shifted signals to broadcast antennas such as panel array antennas 36 through 42 shown in FIG. 2.

Customer premises equipment units 130 within the coverage area 132 of secondary base station 124 receive broadcast signals in the local portion of frequency band B2, and transmit signals to secondary base station 124 in frequency band B1. The signals from CPE units 130 are received by non-directional receiving antennas 126 and sent to the signal processor 50. Signal processor 50 shifts the frequency of the received CPE signals to frequency band A1 and transmits the signals to primary base station 104 via transmit-receive antenna 128. Like secondary base station 114, secondary base station 124 appears to primary base station 104 much like another CPE unit 110.

Unlike secondary base station 114, secondary base station 124 provides relay signals for an additional secondary base station 134. Therefore, signal processor 50 of secondary base station 124 processes the relay portion of the received signal from primary base station 104 to separate the signal content intended for CPE units 130 within the coverage area 132 from signal content intended for further relay to secondary base station 134.

Although various separation methods could be used, such as time division multiplexing, this separation is most easily accomplished if primary base station 104 broadcasts a signal in which a separate frequency band within the relay portion of the broadcast signal is dedicated to CPE units for each secondary base station. One benefit of this method of signal separation is that signal demodulation and remodulation is not required at each base station, as it would be with a time division multiplex approach.

Thus, in network 100, primary base station 104 broadcasts a local signal in the local portion of frequency band A2 and a relay signal in the relay portion of frequency band A2. The relay signal is separated into three frequency sub-bands, each sub-band carrying content for CPE units in communication with one of the secondary base stations 114, 124, 134. Signal processor 50 of secondary base station 132 receives the relay signal from primary base station 104 and shifts the sub-band designated for CPE units 130 into the local portion of frequency band B2. Signal processor So also shifts the sub-band designated for CPE units 140 in the coverage area 142 of secondary base station 134 into the relay portion of frequency band B2. The sub-band designated for CPE units 120 in coverage area 122 is discarded.

Secondary base station 134 is substantially similar in structure to secondary base station 114. Secondary base station 134 includes a repeater node transmitter-receiver system such as system 30 shown in FIG. 2, including a highly directional transmit-receive antenna 138 such as antenna 52. Transmit-receive antenna 138 is directed toward secondary base station 124, and receives broadcast signals therefrom. Transmit-receive antenna 128 may comprise two separate dish antennas, one for signal transmission and one for reception.

Signals received by transmit-receive antenna 138 are sent to a signal processor such as processor 50 shown in FIG. 2. The signal processor, which is mounted on secondary base station 134, shifts the relay portion of the received signals from frequency band B2 to the local portion of frequency band A2, and transmits the shifted signals to broadcast antennas such as panel array antennas 36 through 42 shown in FIG. 2.

Customer premises equipment units 140 within the coverage area 142 of secondary base station 134 receive broadcast signals in the local portion of frequency band A2, and transmit signals to secondary base station 134 in frequency band A1. The signals from CPE units 140 are received by non-directional receiving antennas 136 and sent to the signal processor 50. Signal processor 50 shifts the frequency of the received CPE signals to frequency band B1 and transmits the signals to secondary base station 124 via transmit-receive antenna 138. Thus, secondary base station 134 appears to primary base station 124 much like another CPE unit 130.

Following the pattern described above, network 100 may comprise a grid array of base stations extending indefinitely in any direction. However, unlike network 60, the size of which may be limited primarily by signal-to-noise ratio considerations, the size of network 100 may be constrained by bandwidth considerations. Each additional secondary base station adds to the relay traffic transmitted and received by primary base station 104. Thus, for high-bandwidth communication, such as two-way video transmission, the size of network 100 may be severely constrained. However, for applications such as Internet browsing, in which relatively little bandwidth is required for data transmission from central office 102, and even less bandwidth is required for "backhaul," or CPE-to-central office transmission, a network comprising a significant number of secondary base stations may be practical.

Moreover, bandwidth limitations may be overcome with the use of a plurality of primary base stations such as primary base station 104, each primary base station having a fiber optic cable connection to central office 102. Each primary base station could provide support for several secondary base stations, as illustrated in FIG. 4.

It will be appreciated that network 100, like network 60, comprises a plurality of secondary base stations operable to receive broadcast signals in one frequency band A or B and simultaneously transmit broadcast signals in the other frequency band. This frequency shift minimizes feedback to the receive antennas 118, 128, 138, as does their orientation away from their base stations' respective broadcast antennas. As in network 60, signal content is distributed throughout network 100 without fiber optic cable connections to each base station.

In an alternative embodiment of network 100, base stations 104 and 124, which are responsible for providing relay signals to secondary base stations, may comprise additional directional antennae for the purpose of transmitting and receiving relay signals to and from adjacent secondary base stations. These directional antennas may be, for example, similar to transmit-receive antenna 128, and may comprise separate transmit and receive dish antennas.

Thus, for example, primary base station 104 may comprise two directional transmit-receive antennas (not shown) oriented toward secondary base stations 114 and 124, respectively. Each directional antenna transmits the appropriate frequency sub-band(s) of the relay portion of frequency band A2. In this example, one directional antenna transmits signal content intended for CPE units 120 in coverage area 122 to transmit-receive antenna 118. The other directional antenna transmits signal content intended for CPE units 130 and 140 to transmit-receive antenna 128.

In this embodiment, primary base station 104 only broadcasts signals in the local portion of frequency band A2. Because the relay portion of the signal is transmitted via directional antennas rather than broadcast, transmission power requirements are significantly reduced. Interference in overlapping coverage areas may also be reduced. The directional transmission of relay signals may also increase the permissible separation distance between adjacent base stations.

Moreover, the directional transmission of relay signals allows more efficient spectrum usage. Although the frequency assignments set forth in TABLE A may be used in this embodiment, relay signals could instead be transmitted all at the same frequency. This spectrum re-usage could significantly increase the maximum number of base stations in network 100.

While the invention has been particularly shown and described by the foregoing detailed description, it will be understood by those skilled in the art that various other changes in form and detail may be made without departing from the spirit and scope of the invention.

What is claimed is:

1. A wireless communications system, comprising:
   a central office operable to generate a central office signal;
   a first base station operable to receive the central office signal, and having a first transmitter operable to generate a first broadcast signal in a first frequency range in response to the central office signal, the first broadcast signal including a local signal for customer premises equipment associated with the first base station and a relay signal for customer premises equipment associated with other base stations, the first transmitter operable to transmit the local signal in a local portion of the first frequency range and the relay signal in a relay portion of the first frequency range;
   a second base station having a first receiver operable to receive the first broadcast signal, and having a second transmitter operable to generate a second broadcast signal in a second frequency range in response to the first broadcast signal, the first receiver operable to identify a local signal for customer premises equipment associated with the second base station within the relay portion of the first frequency range, the second transmitter operable to place the identified local signal for customer premises equipment associated with the second base station into the second broadcast signal at a local portion of the second frequency range.

2. The wireless communications system of claim 1, wherein the first and second frequency ranges are mutually exclusive.

3. The wireless communications system of claim 1, further comprising a customer premises equipment unit operable to receive the first broadcast signal.

4. A wireless communications system, comprising:
   a central office operable to generate a central office signal;
   a first base station operable to receive the central office signal, and having a first transmitter operable to generate a first broadcast signal in a first frequency range in response to the central office signal, the first broadcast signal including a local signal for customer premises equipment associated with the first base station and a relay signal for customer premises equipment associated with other base stations, the first transmitter operable to transmit the local signal in a local portion of the first frequency range and the relay signal in a relay portion of the first frequency range;
   a second base station having a first receiver operable to receive the first broadcast signal, and having a second transmitter operable to generate a second broadcast signal in a second frequency range in response to the first broadcast signal, the first receiver operable to identify a local signal for customer premises equipment associated with the second base station within the relay portion of the first frequency range, the second transmitter operable to place the identified local signal for customer premises equipment associated with the second base station into the second broadcast signal at a local portion of the second frequency range; and
   a customer premises equipment unit operable to receive the second broadcast signal, and operable to transmit a first return signal in the second frequency band.

5. A wireless communications system, comprising:
   a central office operable to generate a central office signal;
   a first base station operable to receive the central office signal, and having a first transmitter operable to generate a first broadcast signal in a first frequency range in response to the central office signal, the first broadcast signal including a local signal for customer premises equipment associated with the first base station and a relay signal for customer premises equipment associated with other base stations, the first transmitter operable to transmit the local signal in a local portion of the first frequency range and the relay signal in a relay portion of the first frequency range;
   a second base station having a first receiver operable to receive the first broadcast signal, and having a second transmitter operable to generate a second broadcast signal in a second frequency range in response to the first broadcast signal, the first receiver operable to identify a local signal for customer premises equipment associated with the second base station within the relay portion of the first frequency range, the second transmitter operable to place the identified local signal for customer premises equipment associated with the second base station into the second broadcast signal at a local portion of the second frequency range; and wherein the second base station further comprises:

a third receiver operable to receive a first return signal received from customer premises equipment associated with the second base station; and a first transmitter operable to transmit a second return signal in the first frequency range to the first base station in response to the first return signal.

6. The wireless communications system of claim 5, wherein the second base station further comprises a signal processor operable to receive the first return signal from the third receiver, and operable to generate the second return signal in response to the first return signal.

7. A method for wireless communications, comprising the steps of:

generating an output signal at a central office;

transmitting the output signal of the central office to a first base station;

generating at the first base station a first broadcast signal in a first frequency range in response to the output signal of the central office, the first broadcast signal including a local signal for customer premises equipment associated with the first base station and a relay signal for customer premises equipment associated with other base stations, the local signal being in a local portion of the first frequency range and the relay signal being in a relay portion of the first frequency range;

receiving the first broadcast signal at a second base station;

identifying a local signal of the first broadcast signal for customer premises equipment associated with the second base station within the relay portion of the first frequency range;

placing the identified local signal for customer premises equipment associated with the second base station into a second broadcast signal at a local portion of a second frequency range;

generating at the second base station the second broadcast signal in the second frequency range in response to the first broadcast signal;

receiving the second broadcast signal at a third base station; and generating at the third base station a third broadcast signal in the first frequency range in response to the second broadcast signal.

8. The method of claim 7, further comprising the step of receiving the second broadcast signal at a customer premises equipment unit.

9. A method for wireless communications, comprising the steps of:

generating an output signal at a central office;

transmitting the output signal of the central office to a first base station;

generating at the first base station a first broadcast signal in a first frequency range in response to the output signal of the central office, the first broadcast signal including a local signal for customer premises equipment associated with the first base station and a relay signal for customer premises equipment associated with other base stations, the local signal being in a local portion of the first frequency range and the relay signal being in a relay portion of the first frequency range;

receiving the first broadcast signal at a second base station;

identifying a local signal of the first broadcast signal for customer premises equipment associated with the second base station within the relay portion of the first frequency range;

placing the identified local signal for customer premises equipment associated with the second base station into the second broadcast signal at a local portion of the second frequency range;

generating at the second base station the second broadcast signal in the second frequency range in response to the first broadcast signal;

receiving the second broadcast signal at a third base station;

generating at the third base station a third broadcast signal in the first frequency range in response to the second broadcast signal;

receiving the second broadcast signal at a customer premises equipment unit;

generating at the customer premises equipment unit a first return signal in the second frequency range;

transmitting the first return signal to the second base station;

generating a second return signal in the first frequency range by the second base station in response to the first return signal; and transmitting the second return signal to the first base station.

10. The method of claim 9, wherein the step of generating the second return signal comprises the step of shifting the first return signal to the first frequency range.

11. A wireless communications system, comprising:

a first base station operable to broadcast a first local signal in a first local portion of a first frequency range, the first base station operable to transmit a first relay signal in a second relay portion of the first frequency range;

a second base station operable to receive the first relay signal, the second base station operable to identify a second local signal in the first relay signal for local transmission, the second base station operable to identify a second relay signal in the first relay signal for relay transmission, the second base station operable to broadcast the second local signal in the first local portion of a second frequency range in response to the first relay signal, the second base station operable to transmit the second relay signal in the second portion of the second frequency range in response to the first relay signal; and a third base station operable to receive the second relay signal, the third base station operable to identify a third local signal in the second relay signal for local transmission, the third base station operable to identify a third relay signal in the second relay signal for relay transmission, the third base station operable to broadcast the third local signal in the first local portion of the first frequency range in response to the second relay signal, the third base station operable to transmit the third relay signal in the second relay portion of the second frequency range in response to the second relay signal.

12. The wireless communications system of claim 11, wherein the first and second frequency ranges are mutually exclusive.

13. The wireless communications system of claim 11, further comprising a customer premises equipment unit operable to receive the second local signal.

14. The wireless communications system of claim 11, further comprising a customer premises equipment unit operable to receive the second local signal, and operable to transmit a return signal to the second base station.

15. A method for wireless communications, comprising the steps of:

at a first base station, broadcasting a first broadcast signal having a first local signal in a local portion of a first frequency range;

generating for transmission at the first base station the first broadcast signal having a first relay signal in a second relay portion of the first frequency range;

receiving the first broadcast signal at a second base station;

at the second base station, identifying a second local signal in the first relay signal;

broadcasting a second broadcast signal having the second local signal in the first local portion of a second frequency range in response to the first relay signal;

generating for transmission at the second base station the second broadcast signal having a second relay signal in the second relay portion of the second frequency range in response to the first relay signal;

receiving the second broadcast signal at a third base station; and     at the third base station, identifying a third local signal in the second relay signal;

broadcasting a third broadcast signal having the third local signal in the first local portion of the first frequency range in response to the second relay signal.

16. The method of claim 15, further comprising the steps of:

generating an output signal at a central office; and transmitting the output signal of the central office to a first base station; and     wherein the step of generating the first relay signal is performed in response to the output signal of the central office.

17. The method of claim 15, further comprising the step of receiving the second local signal at a customer premises equipment unit.

18. The method of claim 17, further comprising the steps of:

generating at the customer premises equipment unit a first return signal in the second frequency range;

transmitting the first return signal to the second base station;

at the second base station, generating a second return signal in the first frequency range in response to the first return signal; and     transmitting the second return signal to the first is base station.

19. The method of claim 18, wherein the step of generating the second return signal comprises the step of shifting the first return signal to the first frequency range.

20. A method for wireless communications, comprising the steps of:

generating at a first base station a first signal in a first frequency range, the first signal including a first local signal in a local portion of the first frequency range and a first relay signal in a second relay portion of the first frequency range;

transmitting the first signal to a second base station;

generating at the second base station a second signal in a second frequency range in response to the first signal, the second signal including a second local signal extracted from the first relay signal and a second relay signal extracted from the first relay signal, the second local signal being in the first local portion of the second frequency range, the second relay signal being in the second relay portion of the second frequency range;

transmitting the second signal to a third base station;

generating at the third base station a third signal in the first frequency range in response to the second signal; and     broadcasting the third signal.

21. The method of claim 20, further comprising the steps of:

generating an output signal at a central office; and transmitting the output signal of the central office to a first base station; and     wherein the step of generating the first signal is performed in response to the output signal of the central office.

22. The method of claim 20, further comprising the step of receiving the second local signal at a customer premises equipment unit.

* * * * *